US008965953B2

(12) United States Patent
Anooshfar

(10) Patent No.: US 8,965,953 B2
(45) Date of Patent: Feb. 24, 2015

(54) COMPUTER NETWORK SCANNING

(75) Inventor: Saeed Anooshfar, San Francisco, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1009 days.

(21) Appl. No.: 12/580,221

(22) Filed: Oct. 15, 2009

(65) Prior Publication Data

US 2010/0033763 A1 Feb. 11, 2010

Related U.S. Application Data

(63) Continuation of application No. 09/498,396, filed on Feb. 4, 2000, now Pat. No. 7,644,119.

(51) Int. Cl.

*H04N 1/00* (2006.01)
*H04N 1/32* (2006.01)
*H04L 29/08* (2006.01)

(52) U.S. Cl.

CPC ............ *H04N 1/00222* (2013.01); *H04L 67/32* (2013.01); *H04L 67/125* (2013.01); *H04N 1/00212* (2013.01); *H04N 1/00225* (2013.01); *H04N 1/00954* (2013.01); *H04N 1/00957* (2013.01); *H04N 1/32507* (2013.01)
USPC .......................................................... 709/203

(58) Field of Classification Search

CPC ..... H04N 1/00; H04N 1/00222; H04N 67/32; H04N 67/125
USPC .......................................... 709/203, 217, 219
See application file for complete search history.

(56) References Cited

U.S. PATENT DOCUMENTS

| | | | | |
|---|---|---|---|---|
| 5,123,063 A | | 6/1992 | Ohkubo et al. | 382/318 |
| 5,168,444 A | | 12/1992 | Cukor et al. | 705/1 |
| 5,467,434 A | * | 11/1995 | Hower et al. | 358/1.15 |
| 5,513,126 A | | 4/1996 | Harkins et al. | 364/514 |
| 5,564,109 A | | 10/1996 | Snyder et al. | 710/8 |
| 5,699,489 A | | 12/1997 | Yokomizo | 395/109 |

(Continued)

FOREIGN PATENT DOCUMENTS

| | | |
|---|---|---|
| JP | 7-95373 | 4/1995 |
| JP | 10-28196 | 1/1998 |

(Continued)

OTHER PUBLICATIONS

"PaperPort 5.0 Software for Windows® Getting Started Guide", Visioneer, Inc., 1997.

(Continued)

*Primary Examiner* — Kristie Shingles
(74) *Attorney, Agent, or Firm* — Fitzpatrick, Cella, Harper & Scinto

(57) ABSTRACT

A computer network scanning system and method for fulfilling a scan order using at least one scanner node on a computer network. The computer network scanning includes at least one computer terminal adapted to receive input for the creation of the scan order, at least one order entry server computer configured to create and distribute the scan order, and at least one scanner node, each scanner node configured to process scan orders set to or received by the scanner node. The computer network scanning method includes the steps of creating a can order, submitting he scan order to a scanner node, processing he scan order at the scanner node, and updating the computer network scanning system of the completion of the scan order.

22 Claims, 15 Drawing Sheets

(56) References Cited

U.S. PATENT DOCUMENTS

| | | | | |
|---|---|---|---|---|
| 5,720,013 | A | 2/1998 | Uda et al. | 395/114 |
| 5,726,770 | A | 3/1998 | Harada | 358/444 |
| 5,760,916 | A | 6/1998 | Dellert et al. | 358/408 |
| 5,760,917 | A | 6/1998 | Sheridam | 358/442 |
| 5,764,866 | A | 6/1998 | Maniwa | 358/1.15 |
| 5,768,483 | A | 6/1998 | Maniwa et al. | 358/1.15 |
| 5,845,078 | A | 12/1998 | Tezuka et al. | 395/114 |
| 5,911,044 | A * | 6/1999 | Lo et al. | 709/203 |
| 5,995,721 | A | 11/1999 | Rourke et al. | 358/1.15 |
| 6,025,931 | A | 2/2000 | Bloomfield | 358/402 |
| 6,115,739 | A | 9/2000 | Ogawa et al. | 709/215 |
| 6,134,595 | A | 10/2000 | Huang et al. | 709/229 |
| 6,147,770 | A | 11/2000 | Unishi et al. | 395/200.52 |
| 6,167,456 | A | 12/2000 | Daur et al. | 719/321 |
| 6,167,462 | A | 12/2000 | Davis et al. | 710/5 |
| 6,188,807 | B1 * | 2/2001 | Arakawa | 382/319 |
| 6,208,436 | B1 * | 3/2001 | Cunningham | 358/474 |
| 6,223,223 | B1 * | 4/2001 | Kumpf et al. | 709/227 |
| 6,248,996 | B1 | 6/2001 | Johnson et al. | 250/234 |
| 6,256,662 | B1 * | 7/2001 | Lo et al. | 709/203 |
| 6,289,371 | B1 * | 9/2001 | Kumpf et al. | 709/203 |
| 6,321,266 | B1 * | 11/2001 | Yokomizo et al. | 709/226 |
| 6,412,022 | B1 | 6/2002 | Kumpf et al. | 710/1 |
| 6,425,001 | B2 | 7/2002 | Lo et al. | 709/217 |
| 6,429,952 | B1 | 8/2002 | Olbricht | 358/442 |
| 6,452,692 | B1 | 9/2002 | Yacoub | 358/1.15 |
| 6,459,499 | B1 * | 10/2002 | Tomat | 358/1.15 |
| 6,469,797 | B2 | 10/2002 | Sakai | 358/1.15 |
| 6,480,304 | B1 | 11/2002 | Os et al. | 358/474 |
| 6,487,611 | B1 | 11/2002 | Brusky et al. | 710/10 |
| 6,532,077 | B1 * | 3/2003 | Arakawa | 358/1.13 |
| 6,535,914 | B1 | 3/2003 | Pearson et al. | 709/220 |
| 6,574,663 | B1 | 6/2003 | Bakshi et al. | 709/223 |
| 6,581,098 | B1 | 6/2003 | Kumpf | 709/227 |
| 6,604,157 | B1 | 8/2003 | Brusky et al. | 710/65 |
| 6,606,165 | B1 | 8/2003 | Barry et al. | 358/1.9 |
| 6,618,163 | B1 | 9/2003 | Roosen et al. | 358/1.15 |
| 6,633,913 | B1 | 10/2003 | Chalstrom et al. | 709/226 |
| 6,657,742 | B1 | 12/2003 | Kassmann | 358/1.15 |
| 6,694,384 | B1 | 2/2004 | Moeller et al. | 710/8 |
| 6,704,775 | B1 | 3/2004 | Sato et al. | 709/219 |
| 6,762,851 | B1 | 7/2004 | Lynch et al. | 358/1.15 |
| 6,762,852 | B1 * | 7/2004 | Fischer | 358/1.15 |
| 6,765,691 | B2 | 7/2004 | Kubo et al. | 358/1.9 |
| 6,775,729 | B1 * | 8/2004 | Matsuo et al. | 710/263 |
| 6,804,016 | B2 * | 10/2004 | Hashimoto et al. | 358/1.13 |
| 6,813,037 | B1 | 11/2004 | Collard | 358/1.15 |
| 6,816,272 | B2 | 11/2004 | Oliver | 358/1.15 |
| 6,839,755 | B1 | 1/2005 | Kumpf et al. | 709/225 |
| 6,917,437 | B1 | 7/2005 | Myers et al. | 358/1.15 |
| 6,961,153 | B1 | 11/2005 | Hidaka | 358/468 |
| 7,079,269 | B2 * | 7/2006 | Teeuwen et al. | 358/1.15 |
| 7,088,472 | B1 | 8/2006 | Okubo et al. | 358/2.1 |
| 7,215,434 | B1 * | 5/2007 | Janse et al. | 358/1.15 |
| 2001/0013954 | A1 | 8/2001 | Nagai et al. | 358/444 |
| 2001/0014908 | A1 | 8/2001 | Lo et al. | 709/203 |
| 2001/0043357 | A1 | 11/2001 | Owa et al. | 358/1.15 |
| 2002/0027673 | A1 | 3/2002 | Roosen et al. | 358/1.13 |
| 2002/0059362 | A1 | 5/2002 | Maeda | 709/203 |
| 2003/0055866 | A1 | 3/2003 | Leclair et al. | 709/201 |
| 2005/0052697 | A1 | 3/2005 | Kamiyama et al. | 358/1.15 |

FOREIGN PATENT DOCUMENTS

| | | |
|---|---|---|
| JP | 10-70629 | 3/1998 |
| JP | 10-232925 | 9/1998 |
| JP | 10-276288 | 10/1998 |
| JP | 10-285329 | 10/1998 |
| JP | 11-331468 | 11/1999 |
| JP | 2000-148649 | 5/2000 |

OTHER PUBLICATIONS

“PaperPort Deluxe Software User’s Guide for Windows”, Visioneer, Inc., 1997.

“Canon MultiPASS™ C5500—MultiPASS™ Desktop Manager for Windows Version 3.0, Software User’s Guide”, Canon, Inc., 1997-98.

“HP 9100C Digital Sender Data Sheet”, <http://www.hp.com/peripherals/printers/9100c.html>. (Visited Jan. 15, 1999).

“Xerox CentreWare: Products Scanning”, <http://www.centreware.com/products/scanning.html> (visited Jan. 15, 1999).

“Xerox CentreWare: Products”, (visited Jan. 15, 1999) <http://www.centreware.com/products/scanning_spec.html> (visited Jan. 15, 1999).

“Axis Communications—Products—Axis 700 Network Scan Server”, <http://www.axis.com/glocal/products/scan_servers/index.html> (visited Jan. 15, 1999).

“Axis Communications—Products—Axis 700 Network Scan Server”, <http://www.axis.com/products/axis_700/> (visited Jan. 15, 1999).

“Axis Communications13 Products—Network Scan Servers Data”, <http://www.axis.com/products/axis_700/axis_700_data.html> (visited Jan. 15, 1999).

“Axis 700 User’s Guide”, Axis Communications AB, Jun. 1998.

“VistaScan (for PC) User’s Guide”, UMAX Data Systems, Inc., 1994-1996.

Japanese Office Action dated Dec. 14, 2009. from corresponding Japanese Application No. 2001-028765.

* cited by examiner

1000

| SELECT | ID | NAME | MODEL | COLOR | CITY | LOCATION | SITUATED AT | CONTACT PHONE | NOTE |
|---|---|---|---|---|---|---|---|---|---|
| ☐ | 1 | CRA ALPHA SCANNER | ALPHA-01 | NO | PALO ALTO | CANON RESEA-RCH CENTER AMERICA | CENTRAL COPYING AREA | | |
| ☐ | 2 | TOKYO CB2 | ALPHA-01 | NO | TOKYO | CANON HEAD-QUARTERS | BUILDING CB,SECOND FLOOR PRINT ROOM | | |
| ☐ | 3 | GERDA | ALPHA-01 | NO | FRANKFURT-AM-MAIN | CANON DEUTSCHLAND | HANS BAU | | |

DATE:29 DEC 99 02:46:47
FROM: SANOOSH@CRA.CANON.COM
TO: NETSCAN@CRA.CANON.COM
<SCANNER>100</SCANNER>
<BUTTON>SUBMIT SCAN ORDER</BUTTON>
<NOTE>PLEASE SCAN ALL PAGES INCLUDING BLANK ONES</NOTE>
<DOCUMENT>RFC1939</DOCUMENT>
<COUNT>100</COUNT>
<REQUESTERNAME>SAEED ANOOSHFAR</REQUESTERNAME>
<TIME>APR 7, 2000</TIME>
<REQUESTEREMAIL>SANOOSH@CRA.CANON.COM</REQUESTEREMAIL>
<RECIPIENTS></RECIPIENTS>
<EXPIRATION>V1</EXPIRATION>
X-UIDL:945910275
STATUS: U

FIGURE 11

COMPUTER NETWORK SCANNING

CROSS-REFERENCE TO RELATED APPLICATIONS

This application is a continuation of U.S. application Ser. No. 09/498,396, filed Feb. 4, 2000, the contents of which is incorporated herein by reference.

TECHNICAL FIELD

This invention pertains to the field of creating scan orders from a local computer terminal and fulfilling the scan order using scanner nodes connected to a computer network and shared by all computer terminals on the network.

BACKGROUND ART

In the traditional mode of operation, requesting the scanning of a document located remotely is a very time-consuming, inefficient and error-prone process. Under such traditional mode, a requestor must send a request to the location where the document resides. The recipient and processor of the request (hereafter "scan clerk") must manually prepare the scanner for operation according to the specifications of the requester including, for example, setting scanner options such as color, resolution, format, number of pages and security password. To make matters more difficult, scanners often have limited user interface capabilities, with minimalistic, button-oriented control panels. Programming a long set of actions using few buttons can be cumbersome and frustrating.

After the document has been scanned into the scanner in the traditional mode, the scan clerk must manually forward the scanned document to each of the designated recipients per the instructions of the requestor. This typically requires, among other things, the manual creation of a cover sheet for each recipient which includes contact information and any other special instructions and the physical sending of the scanned document along with cover sheet to each recipient. Needless to say, the creation of such a cover sheet for and the sending of the scanned document to each recipient is a tedious, time-consuming and error-prone process.

In addition, under the traditional mode of operation, there is no way of automatically notifying the requestor (or others) that the scan order has been processed. If the requestor requires such notification, the scanner clerk must either physically deliver to the requestor a copy of the notification (such notification often consisting of a copy of the scanned document along with the cover sheet time-stamped) to the requester, or draft and send an email to the requestor.

Moreover, under the traditional mode of operation, because the scanners are not linked via a computer network, the requester can send the scan request to only a single scan clerk for processing at a single scanner. If such person and/or scanner is busy, non-functioning or otherwise unavailable, the requester must wait until such resource becomes free and available, even though there may be other scanners and scanner clerks with the capability to process such request within the rest of the company. In short, having scanners which are not linked together on a computer network fails to optimize the use of the available scanning resources since scanning jobs directed to a busy scanner cannot be re-routed to another scanner which is not being utilized.

Given the foregoing, there is a need for an automated, networked, easy-to-use, resource maximizing system and method for scanning documents.

DISCLOSURE OF INVENTION

The present invention is a computer network scanning system (100) and method (300) for creating and fulfilling a scan order over a computer network. The computer network scanning system (100) comprises: (A) at least one computer terminal (105) adapted to receive input for the creation of the scan order; (B) at least one order entry server computer (115) configured to create and distribute the scan order, each order entry server computer (115) coupled to each terminal (105); and (C) at least one scanner node (125), each scanner node (125) coupled to each order entry server computer (115) and each scanner node (125) configured to process scan orders (1100) sent to the scanner node (125). The computer network scanning method (300) comprises: (W) creating a scan order (1100); (X) submitting the scan order (1100) to scanner node(s) (125); (Y) processing the scan order (1100) at the scanner node(s) (125); and (Z) updating the system (100) of the completion of the scan order (1100).

BRIEF DESCRIPTION OF THE DRAWINGS

These and other more detailed and specific objects and features of the present invention are more fully disclosed in the following specification, reference being made to the accompanying drawings, in which:

FIG. 10 illustrates a sample list 1000 of scanner nodes 125 on a computer network scanning system 100 of the present invention.

FIG. 11 illustrates a sample scan order 1100 in an embodiment of the present invention.

DETAILED DESCRIPTION OF THE PREFERRED EMBODIMENTS

Figure 1:
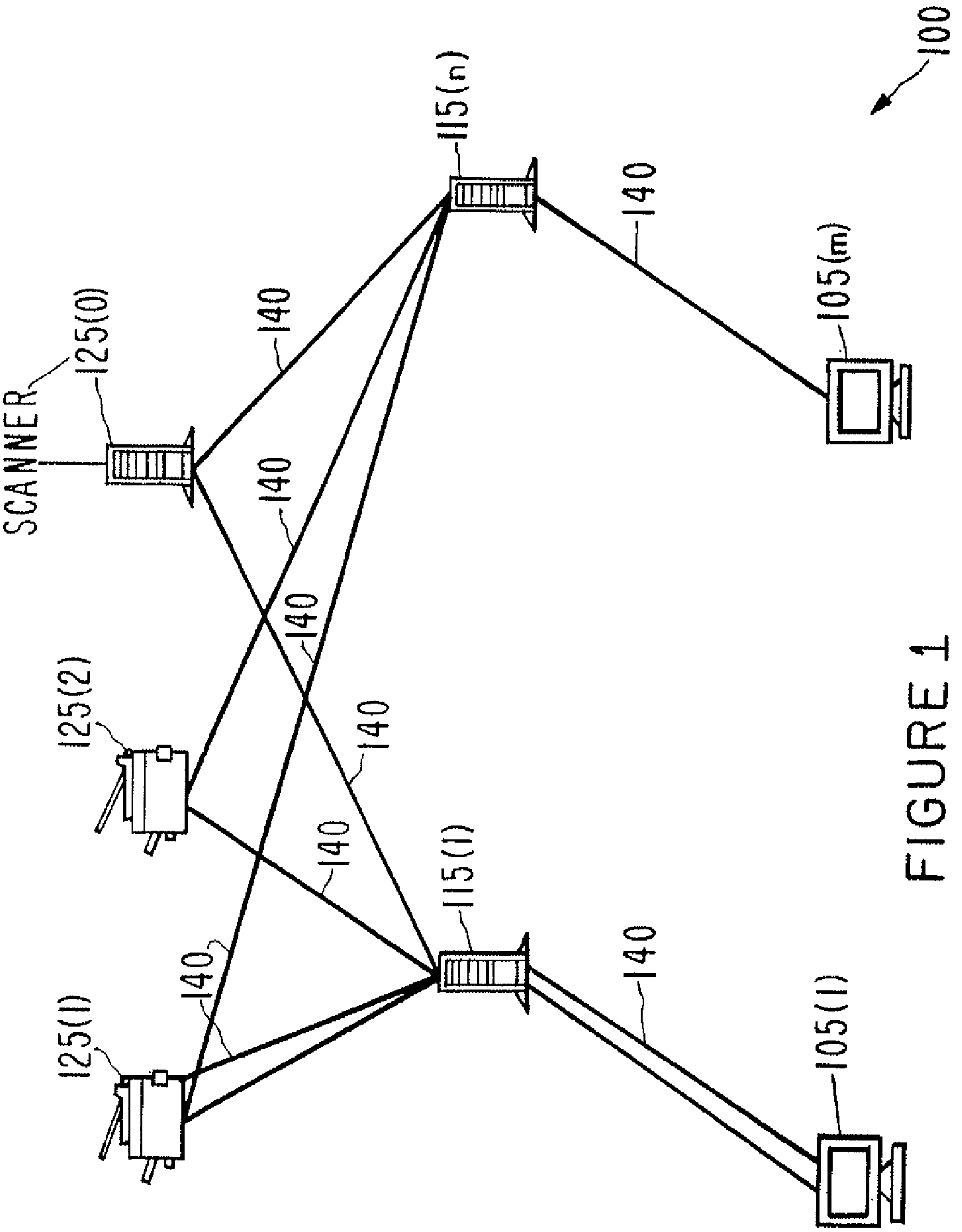
FIG. 1 is a diagram of one embodiment of the computer network scanning system 100 of the present invention.

FIG. 1 is a diagram of one embodiment of the computer network scanning system 100 of the present invention. The computer network scanning system 100 includes at least one local computer terminal 105, at least one order entry server computer 115, and at least one scanner node 125, all coupled via a computer network 140 as shown in FIG. 1, which network 140 may be wired, wireless or both. There may be an arbitrary number of terminals 105(1)-**105(*m*), order entry server computers 115(1)-115(*n*), and scanner nodes 125(1)-125(*o*), and the scanner nodes 125 may have different configurations. For example, the scanner node 125(*o*) consists of a scanner and a server, whereas the scanner node 125(1)** consists simply of a scanner with processor on the scanner.

Figure 9:
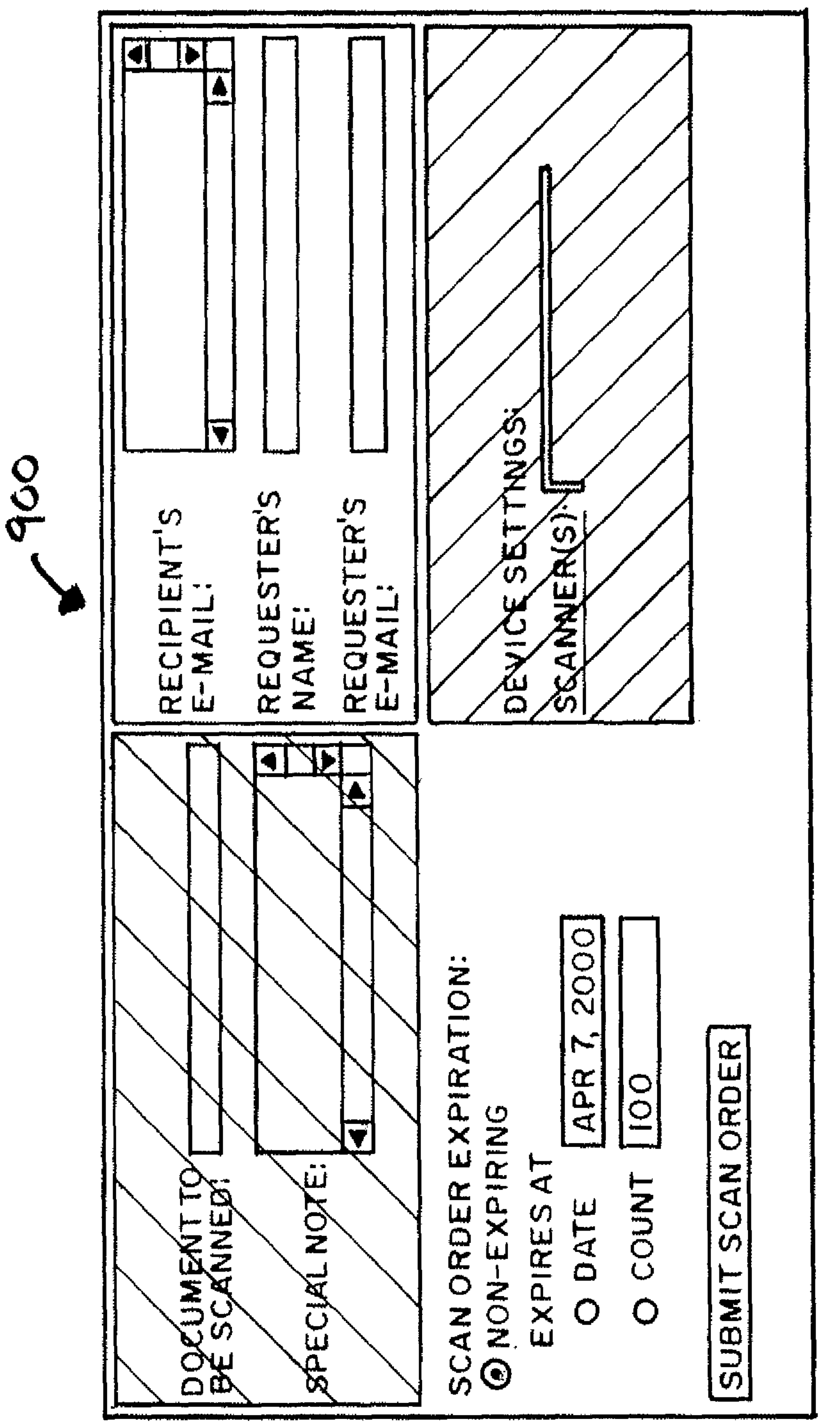
FIG. 9 illustrates a sample scan order entry form 900 in an embodiment of the present invention.

A requester may enter his or her scan order 1100 via a scan order entry form 900, a sample of which form is shown in FIG. 9, through a terminal 105. A sample scan order 1100 is shown in FIG. 11. An order entry server computer 115 coupled to the terminal 105 facilitates the creation and submission of the scan order 1100 for processing by the scanner node(s) 125 designated in the scan order 1100. Each scanner node 125 designated in the scan order 1100 receives the scan order 1100 sent by the order entry server computer 115, processes the scan order 1100, then updates the computer network scanning system of the completion of such scan order 1100.

Figure 2:
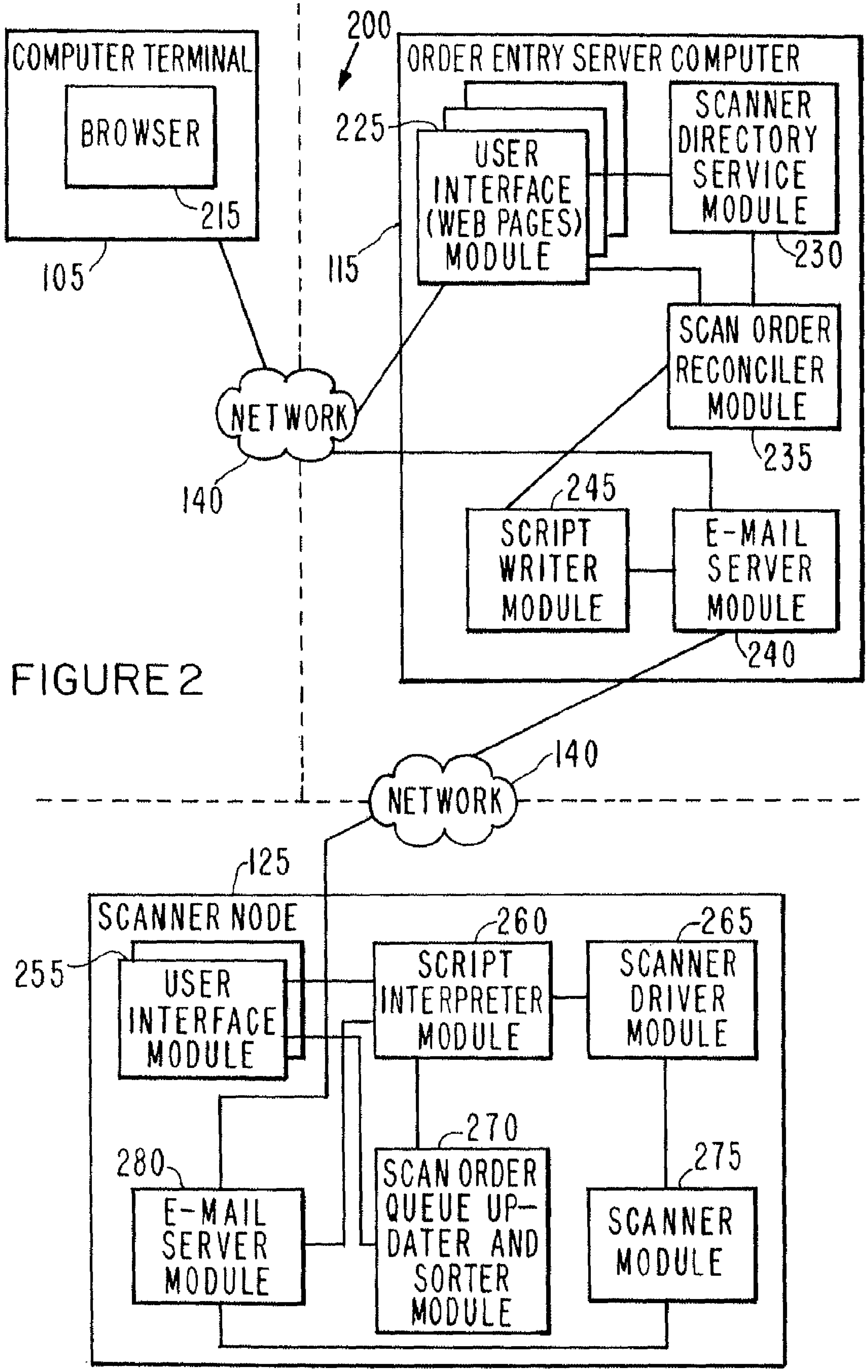
FIG. 2 is a block diagram of one embodiment of the computer network scanning system 100 of the present invention.

FIG. 2 is a block diagram of one embodiment of the computer network scanning system 100 of the present invention. As shown in FIG. 2, a terminal 105 has access to browser software 215. An order entry server computer 115 includes a user interface module 225, a scanner directory service module 230, a scan order reconciler module 235, an email server module 240, and a script writer module 245. Each module of the order entry server computer 115 is coupled to another as shown in FIG. 2, and the modules may be implemented in hardware, software and/or firmware.

A requester sitting at a local terminal 105 uses the browser software 215 to invoke a scan order entry form 900. An order entry server computer 115, among other things, (a) provides a scan order entry form 900 to each requester via the computer network 140 so the requester can input the relevant scanner settings and parameters, (b) verifies, using the scan order reconciler module 235, that the scanner nodes 125 selected by the requestor are capable of performing the requested scanning, (c) converts, using the script writer module 245, the input received from the requester into a scan order 1100, and (d) emails, using the email server module 240, the scan order 1100 over the computer network 140 to the scanner node(s) 125 designated in the scan order 1100.

In one embodiment of the computer network scanning system 100, the scanner directory service module 230 is a database containing a capability profile of each scanner node 125 on the computer network 140, each capability profile having been entered into the database in advance of the use of the computer network 140. In an alternative embodiment of the computer network scanning system 100, the scanner directory service module 230 is a protocol based lookup/discovery software module such as Sun Microsystems, Inc.'s JIM which can generate a capability profile for a given scanner node 125 on demand. A capability profile may include such information as LJRL, user-friendly name, model, geographical location, resolution and color scanning ability of the scanner node 125. The above embodiments simply illustrate two implementations of the scanner directory service module 230. Any other software, hardware and/or firmware which is capable of providing or determining the capabilities of the scanner nodes on the computer network can also be used as a scanner directory service module.

The scan order entry form 900 may contain multiple fields, each field capable of receiving relevant input information from the requester such as requestor's email address, address(es) of recipient(s) of the scanned document, address(es) of parties to be notified of the scanning (but not sent a copy of the scanned document), name of document to be scanned, selected scanner node(s) 125, resolution setting of scanner node(s) 125, and any additional instructions. As noted above, an example of a scan order entry form 900 is shown in FIG. 9. By clicking on "Scanner(s)" under "Device Settings" shown in FIG. 9, the requester receives the scanner nodes 125(1)-**125(*o*) available on the computer network 140 as shown at 1000 in FIG. 10. The requestor may then select which scanner node(s) 125(1)-125(*o*) he or she wishes to process the scan order 1100 by checking the "select" column in FIG. 10. As can be seen in FIG. 10, the list of scanner nodes 125 may include such information as scanner name, model, whether the scanner node 125 is capable of color scans, location, contact information and any other special notes. The list of scanner nodes 125 shown in FIG. 10 is generated by the scanner directory service module 230**.

Figures 12, 12A, 12B, 12C:
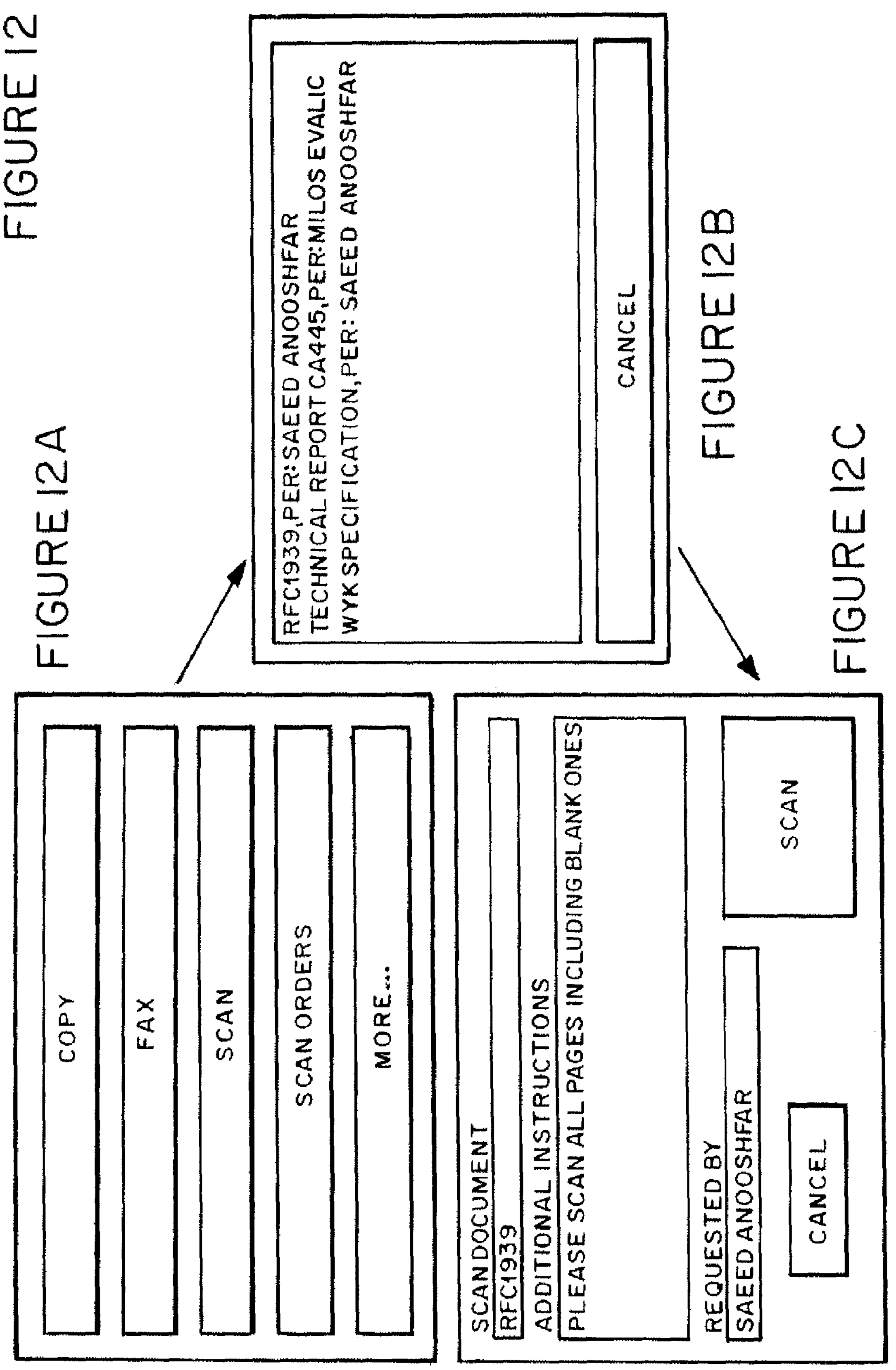
FIG. 12 illustrates examples of various user interfaces of a scanner node 125.

As further illustrated in FIG. 2, a scanner node 125 includes a script interpreter module 260, a scanner driver module 265, a scanner module 275, an email server module 280, a scan order queue updater and sorter module 270, and a user interface module 255. Each module of the scanner node 125 is coupled to another as shown in FIG. 2, and each module may be implemented in hardware, software and/or firmware. A scanner node 125, among other things, (a) parses the scan order 1100 using the script interpreter module 260, (b) sets the settings and parameters of the scanner module 275 using the scanner driver module 265, (c) scans the item designated in the scan order 1100 to create an electronic image of the item using the scanner module 275, (d) updates and sorts the queue of the scanner node 125 using the scan order queue updater and porter module 270, (e) using the email server module 280, sends the electronic image of the scanned item to the address(es) indicated in the scan order 1100, (f) notifies the requestor and any other parties indicated in the scan order 1100 of the completion of the scan order 1100 using the email server module 280, (g) updates the scanner nodes 125 on the computer network 140 of the completion of the scan order 1100. The operations of the order entry server computer 115 and scanner node 125 are described in greater detail in connection with the discussion associated with FIGS. 3-8. Examples of various user interfaces of a scanner node 125 are illustrated in FIG. 12. Specifically, FIG. 12A illustrates the user interface of the scanner node 125, which permits copying, faxing, scanning or viewing of scan orders 1100. FIG. 12B illustrates an example of a list of scan orders 1100 in a queue of a scanner node 125. FIG. 12C illustrates a scan order 1100 that has been selected for processing and that appears on the user interface 255 of a scanner node 125.

Figure 3:
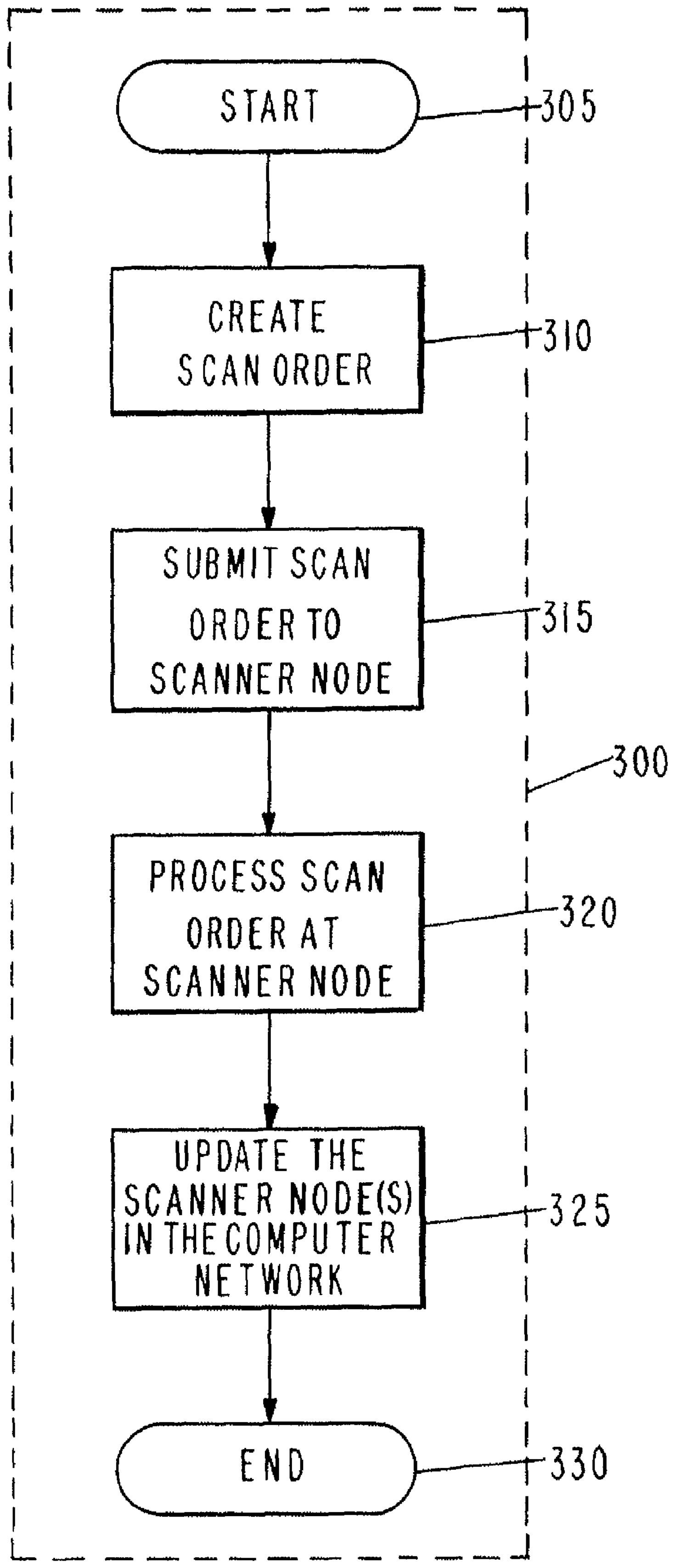
FIG. 3 is a flow diagram illustrating a first embodiment of the computer network scanning method 300 of the present invention.

FIG. 3 is a flow diagram illustrating one embodiment of the computer network scanning method 300 of the present invention. At the start 305 of the operation, the requestor situated at a terminal 105 interacts with an order entry server computer 115 to create 310 a scan order 1100. After creating 310 the scan order 1100, which is discussed more fully in connection with FIG. 4, the order entry server computer 115 submits 315 the scan order 1100 to the scanner node 125 designated in the scan order 1100 using the email server module 240, and the scanner node 125 processes 320 the scan order 1100, which is discussed more fully in connection with FIG. 6. Finally, the scanner node 125 updates 325 all relevant scanner nodes 125 of the completing of the scan order 1100, which is discussed more fully in connection with FIG. 8. In a preferred embodiment, the email server module 280 performs such updating 325 by sending emails to such scanner nodes 125. The process then ends at 330.

Figure 4:
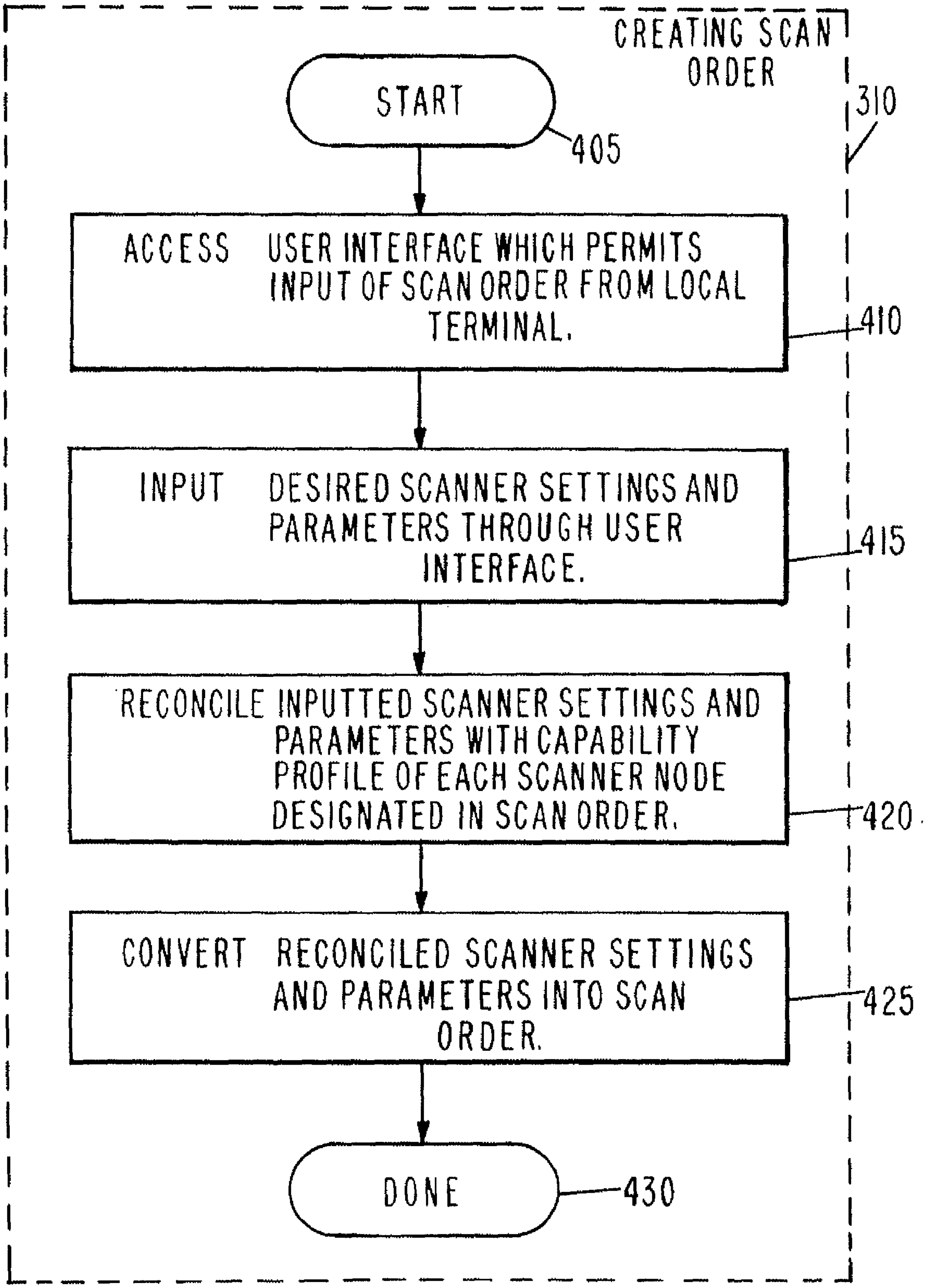
FIG. 4 is a flow diagram illustrating one method of creating a scan order 310 in the present invention.

FIG. 4 is a flow diagram illustrating one method of creating a scan order 1100 as shown aw 310 in FIG. 3 in the present invention. As shown in FIG. 4, creating 310 a scan order 1100 includes the following steps: (a) accessing 410 from an order entry server computer 115 a user interface module 225 which permits the input of a scan order 1100 from a local terminal 105; (b) inputting 415 from the local terminal 105 a desired set of scanner settings and parameters through the accessed user interface module 225 at the terminal 105; (c) reconciling 420 the inputted scanner settings and parameters with a capability profile associated with each scanner node 125 designated in the scan order 1100 (as discussed more fully in connection with FIG. 5); and (d) converting 425 the reconciled scanner settings and parameters into a scan order 1100 using the script writer module 225 in the order entry server computer 115, whereafter the process is done at 430. In a preferred embodiment of the present invention, the step of accessing 410 a user interface module 225 may involve the use of a Web browser to retrieve (i.e., download) a World Wide Web page which is adapted to receive input concerning scanner settings and parameters.

As noted above, a sample scan order 1100 is shown in FIG. 11. As can be seen in FIG. 11, the scan order 1100 may be a script in standard ASCII text format and may contain special mark-up coding language to facilitate the parsing and interpretation of the scan order 1100 by the script interpreter module 260 as discussed in greater detail below.

Figure 5:
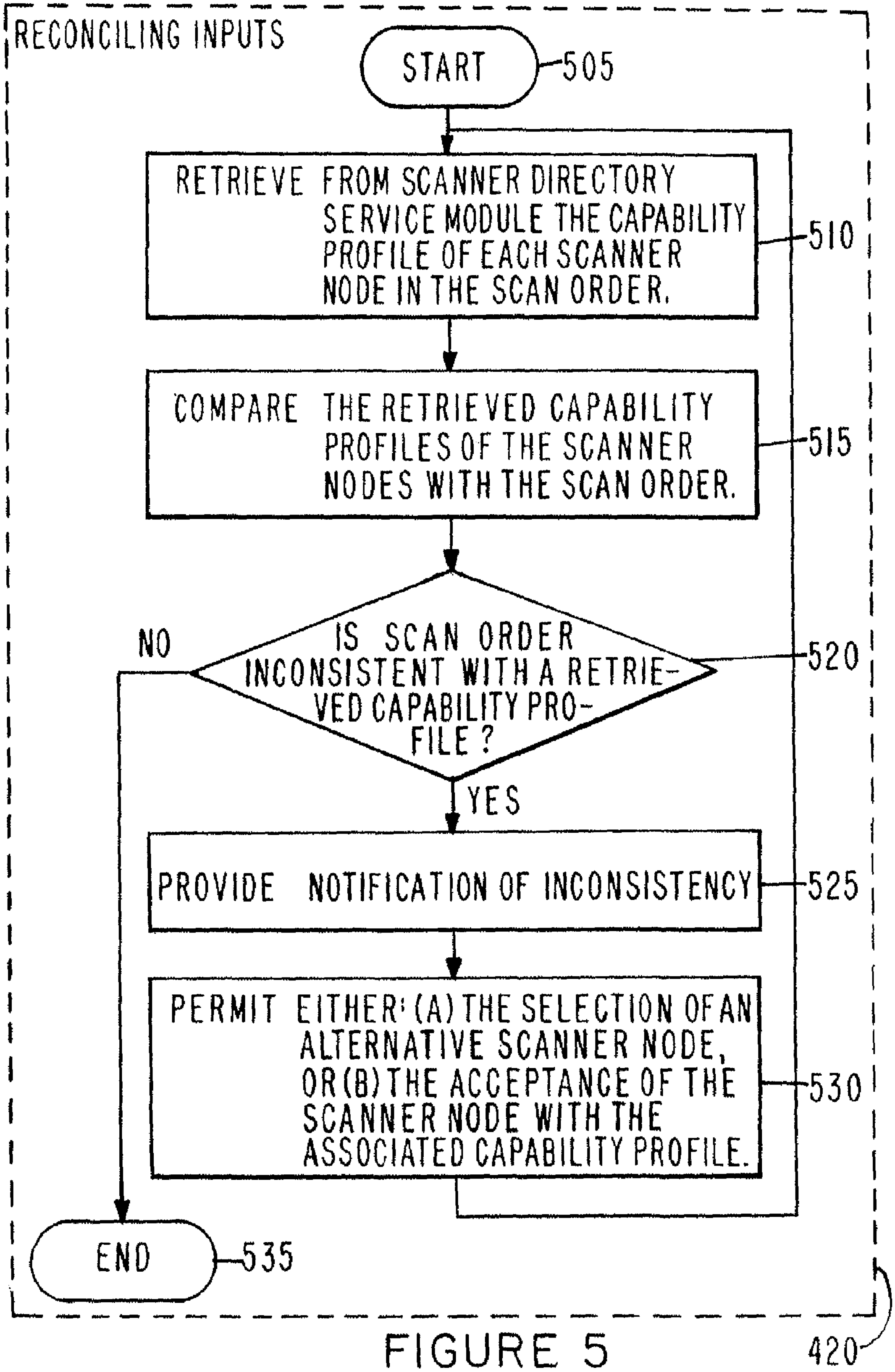
FIG. 5 is a flow diagram illustrating one method of reconciling 420 inputted scanner settings and parameters with a capability profile of each scanner node 125 designated in a scan order 1100.

FIG. 5 illustrates a flow diagram for one method of reconciling inputted scanner settings and parameters with a capability profile of each scanner node 125 designated in the scan order 1100, as shown at 420 in FIG. 4. At the start 505 of the operation, the order entry server computer 115 retrieves 510 from the scanner directory service module 230 the capability profile of each scanner node 125 designated in the scan order 1100. The order entry server computer 115 then compares 515 the retrieved capability profiles with the scan order 1100 and determines 520 whether the scan order 1100 is inconsistent with any retrieved capability profile. If yes, the order entry server computer 115 provides notification 525 of the inconsistency to the requester using the user interface module 225 and permits 530 either: (a) the selection of an alternative scanner node 125(*x*,); or (b) the acceptance of the selected scanner node 125(*x*,,), even though such scanner node 125 (*xo*) lacks the full, desired capabilities. Otherwise, if the scan order 1100 is consistent with all retrieved capability profiles, reconciliation 420 is complete 535. For example, if a requester has requested the scanning of a document with 1200 dpi resolution, but has selected a scanner node 125(*x*,,) that can handle resolution, of only 600 dpi or lower, the entry order server 115—will want the requester of this inconsistency and permit the requester to select another scanner node 125(*x*,) (presumably capable of scanning with 1200 dpi resolution) or to continue with the originally selected scanner node 125(*xo*) which can scan with only 600 dpi resolution.

Figure 6:
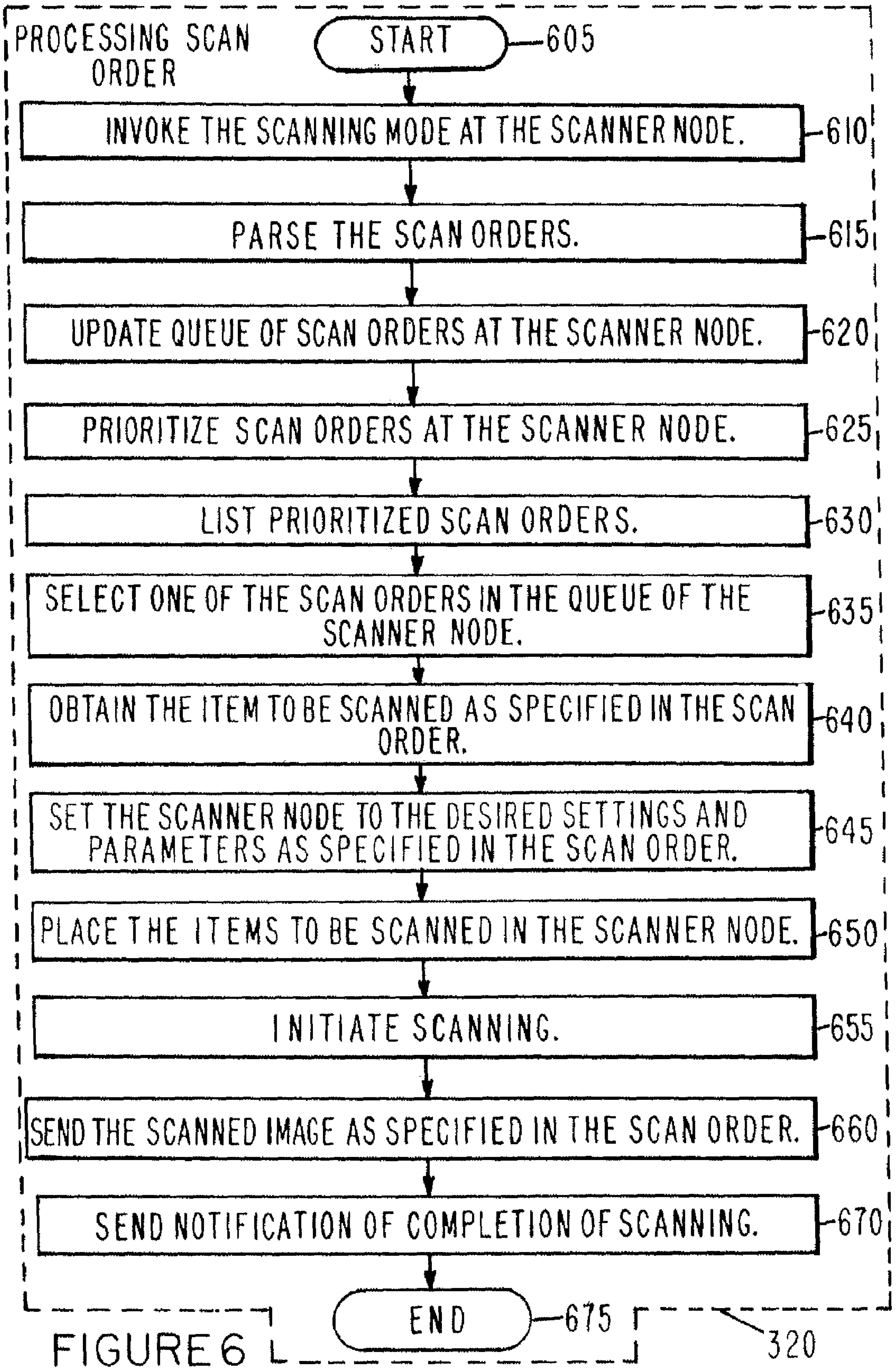
FIG. 6 is a flow diagram illustrating one method of processing 320 a scan order 1100 in the present invention.

FIG. 6 illustrates a flow diagram of one method of processing a scan order 1100 as shown at 320 in FIG. 3 in the present invention. At the start 605 of the operation, the scanning mode of the scanner node 125 is invoked 610. Next, the script interpreter module 260 in the scanner node 125 parses 615 the scan order 1100. The scanner node 125 then: (a) updates 620 the queue of scan orders 1100 at the scanner node 125 using a process which eliminates from the queue all scan orders 1100 that are time-expired or count-expired; (b) prioritizes 625 the scan orders 1100 in the updated queue according to a predetermined algorithm; (c) lists 630 the prioritized scan orders 1100; (d) has one of the scan orders 1100 in the queue selected 635; (e) has the item to be scanned obtained 640; (f) sets 645 the scanner node 125 to the desired settings and parameters as specified in the scan order 1100 (as discussed more fully in connection with FIG. 7); (g) has the item to be scanned placed 650 into the scanner module 275; (h) initiates 655 scanning; (i) sends 660 a scanned image to the address(es) and according to the instructions specified in the scan order 1100 using the email server module 280; and (j) sends 670 notification using the email server module 280 of completion of the scan order to any parties indicated in the scan order 1100, whereafter the process ends at 675. Possible predetermined algorithms in step (b) above include, but are not limited to, first-in first-out, alphabetical based on requestor's name or document name, or requestor specified priority level (e.g., high, medium or low).

Figure 6A:
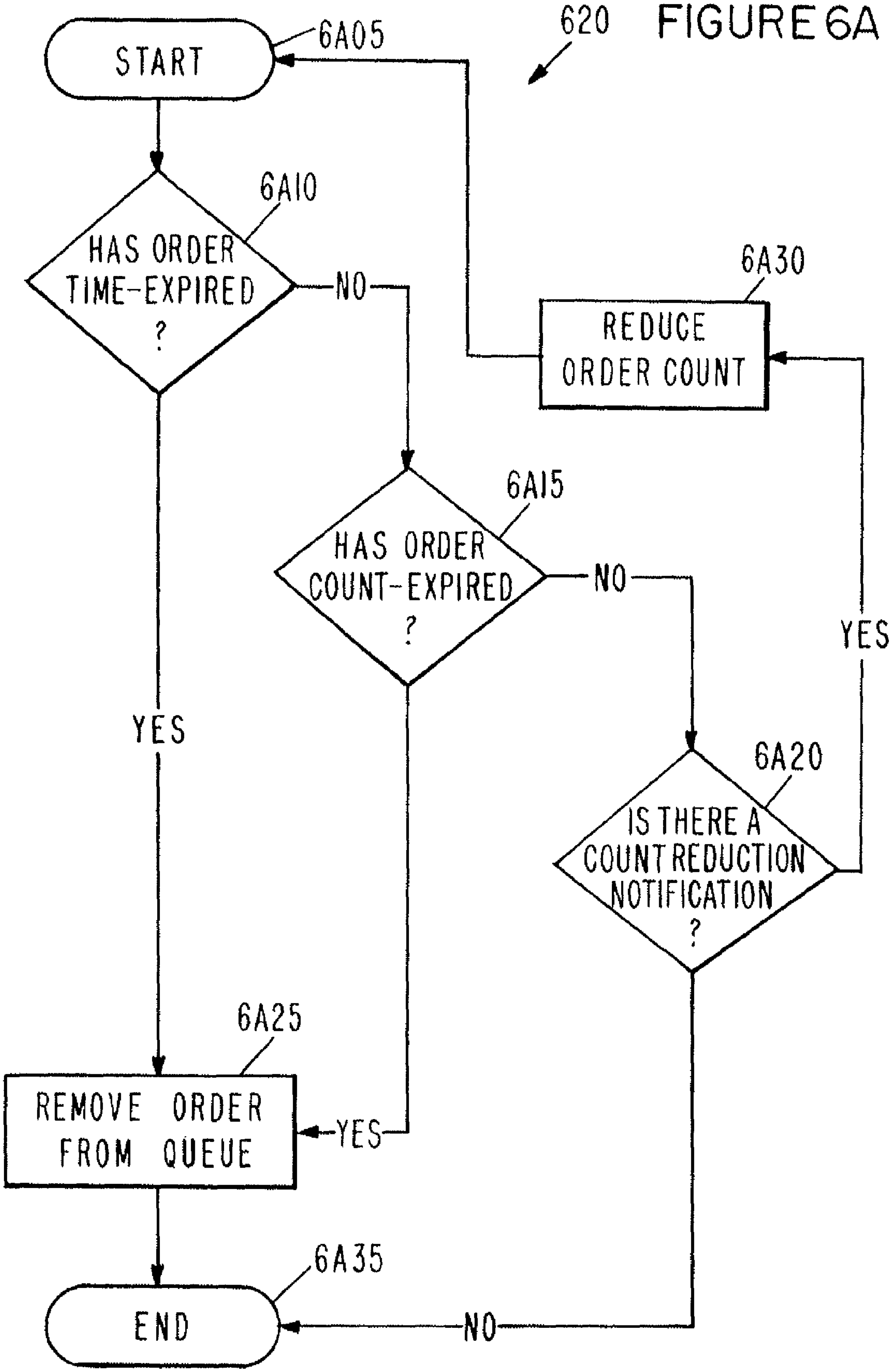
FIG. 6A is a flow diagram illustrating one method of updating the queue of scan orders 1100 at a scanner node 125.

FIG. 6A is a flow diagram of one method of updating 620 the queue of scan orders 1100 at a scanner node 125, as described in step (a) in the paragraph above. At the start 6A05 of the operation, the scanner node 125 determines 6A10 whether the scan order 1100 has time expired. If yes, the scanner node 125 removes 6A25 the scan order 1100 from the queue. If no, the scanner node 125 determines 6A15 whether the scan order 1100 has count-expired. In other. words, if a scan order 1100 indicates that it is to be performed a multiple number of times, the scan order 1100 has "count-expired" if the scan order 1100 has already been performed the specified number of times. If the scan order 1100 has "count-expired," the scanner node 125 removes 6A25 the scan order 1100 from the queue. If the scan order 1100 has not "Count expired," the scanner node 125 determines 6A20 whether there is a count reduction notification for the scan order 1100. If yes, the count associated with the scan order 1100 is reduced 6A30, and the steps illustrated in FIG. 6A are repeated. Otherwise, the updating 620 has been completed 6A35.

Figure 7:
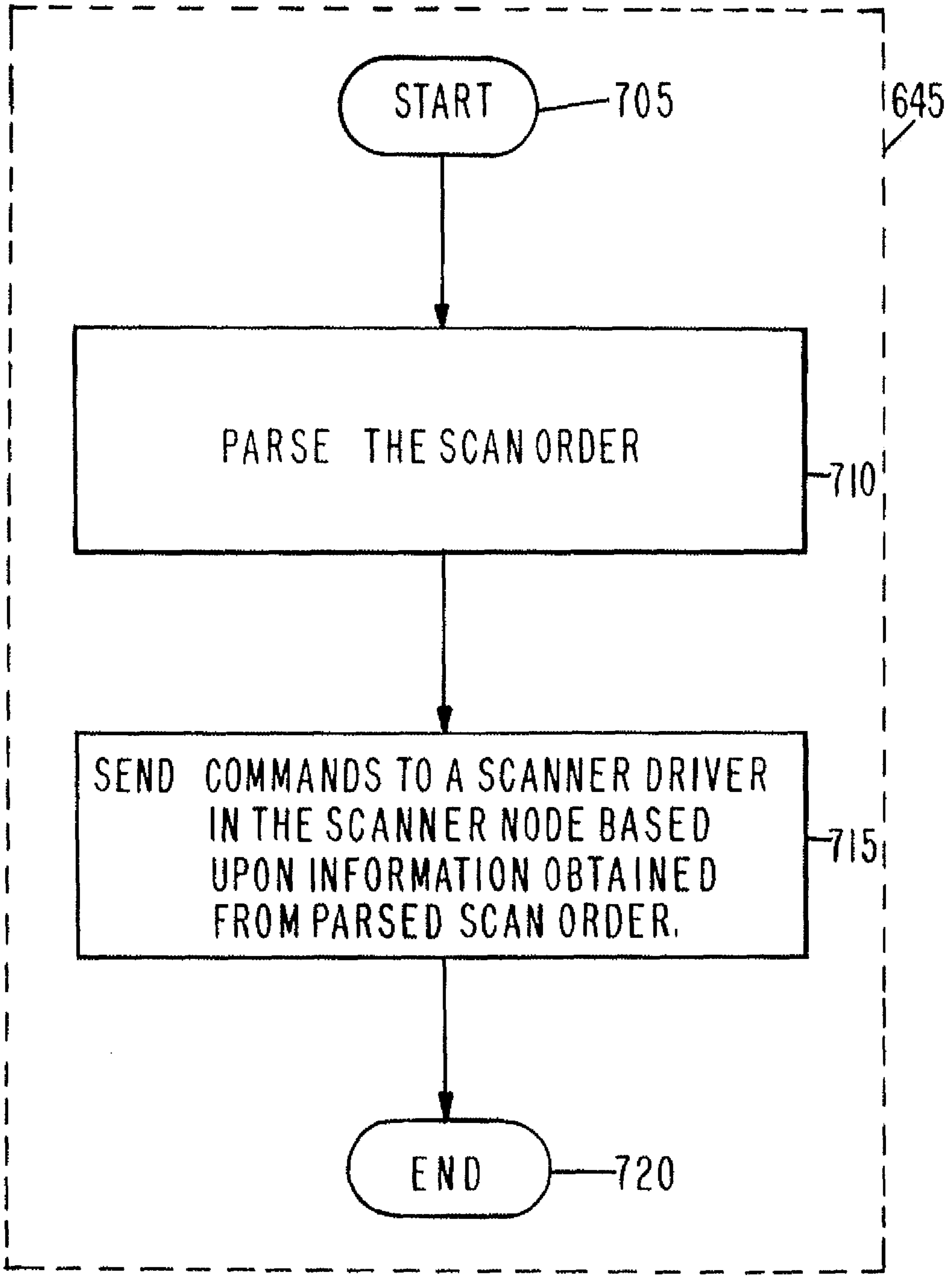
FIG. 7 is a flow diagram illustrating one method of setting 645 the scanner node 125 to the desired settings and parameters as specified in a scan order 1100.

FIG. 7 is a flow diagram of one method of setting the scanner node 125 to the desired settings and parameters as specified in the scan order 1100, as shown at 645 in FIG. 6. At the start 705 of the operation, the scanner node 125 parses 710 the scan order 1100 using the script interpreter module 260 in the scanner node 125, and the scanner node 125 sends 715 commands to the scanner driver module 265 based upon information obtained from the parsed scan order 1100, after which the process ends at 720.

Figure 8:
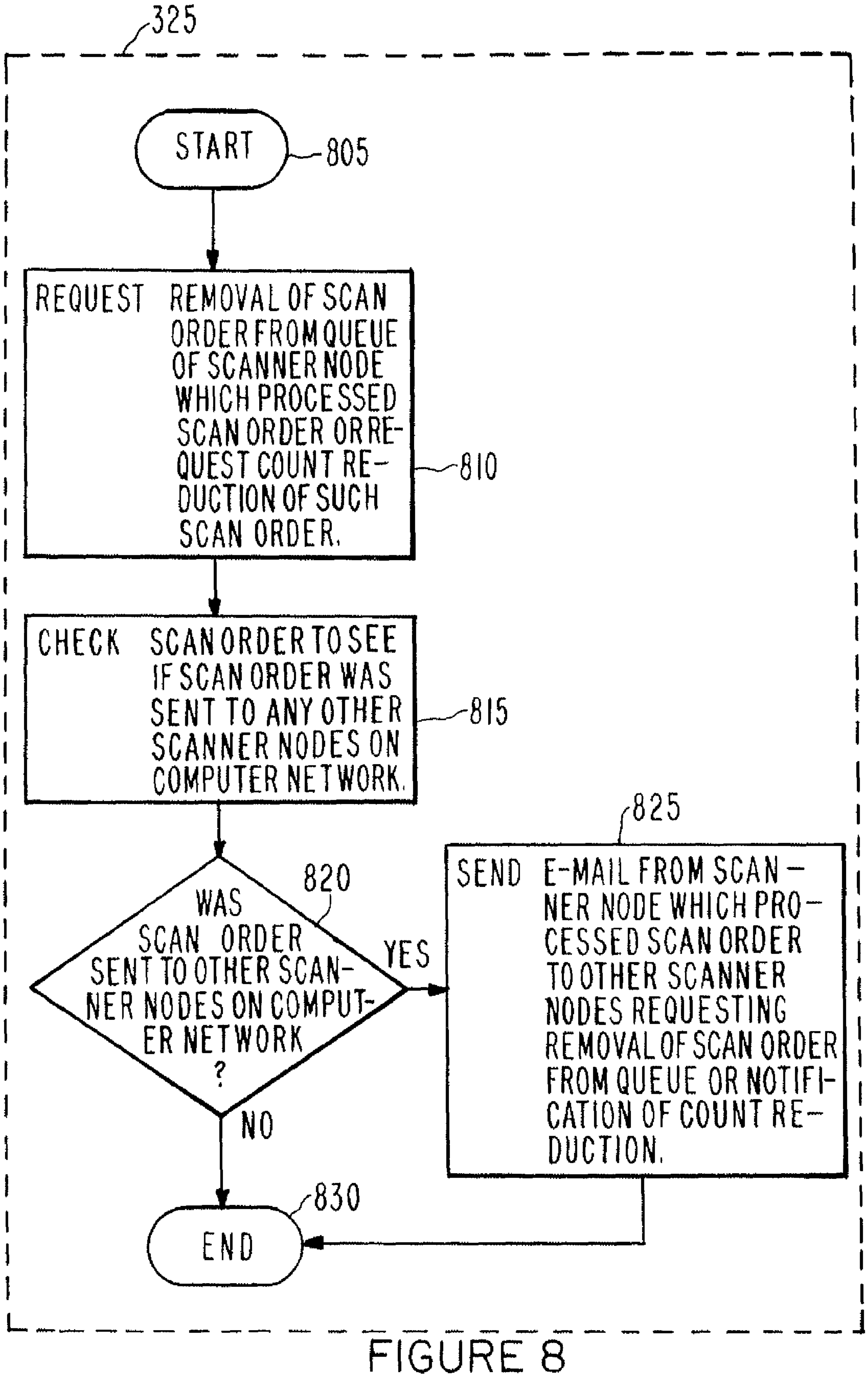
FIG. 8 is a flow diagram illustrating one method of updating the computer network scanning system 100 in the first embodiment of the present invention.

FIG. 8 is a flow diagram of one method of updating the scanner nodes 125 in the computer network 140 after a scanner node 125(*xa*) has processed a scan order 1100, as shown at 325 in FIG. 3. At the start 805 of the operation, the scanner node 125(*x*,) that processed the scan order 1100 either requests removal 810 of the scan order from its queue or requests count reduction of the scan order. The scanner node 125(*x*,) requests removal of the scan order 1100 when the count in the scan order 1100 is one. Next, the scanner node 125(*x*,) checks 815 to see if the scan order 1100 was sent to any other scanner node(s) 125(*x*). If the scanner node 125(*x*,) determines 820 that the scan order 1100 was sent to other scanner node(s) 125(*x*), the scanner node 125(*x*(,) that processed the scan order 1100 sends 825 an email using the email server module 280 to the other scanner node(s) 125(*x*) that received the scan order 1100, requesting either removal or count reduction of the scan order 1100. Again, the scanner node 125($x$(,) requests removal of the scan order 1100 when the count in the scan order 1100 is one. Otherwise, if the scanner node 125($x$,) determines 820 that the scan order 1100 was not sent to other scanner node(s) 125($x$), the updating is complete 830.

Figure 13:
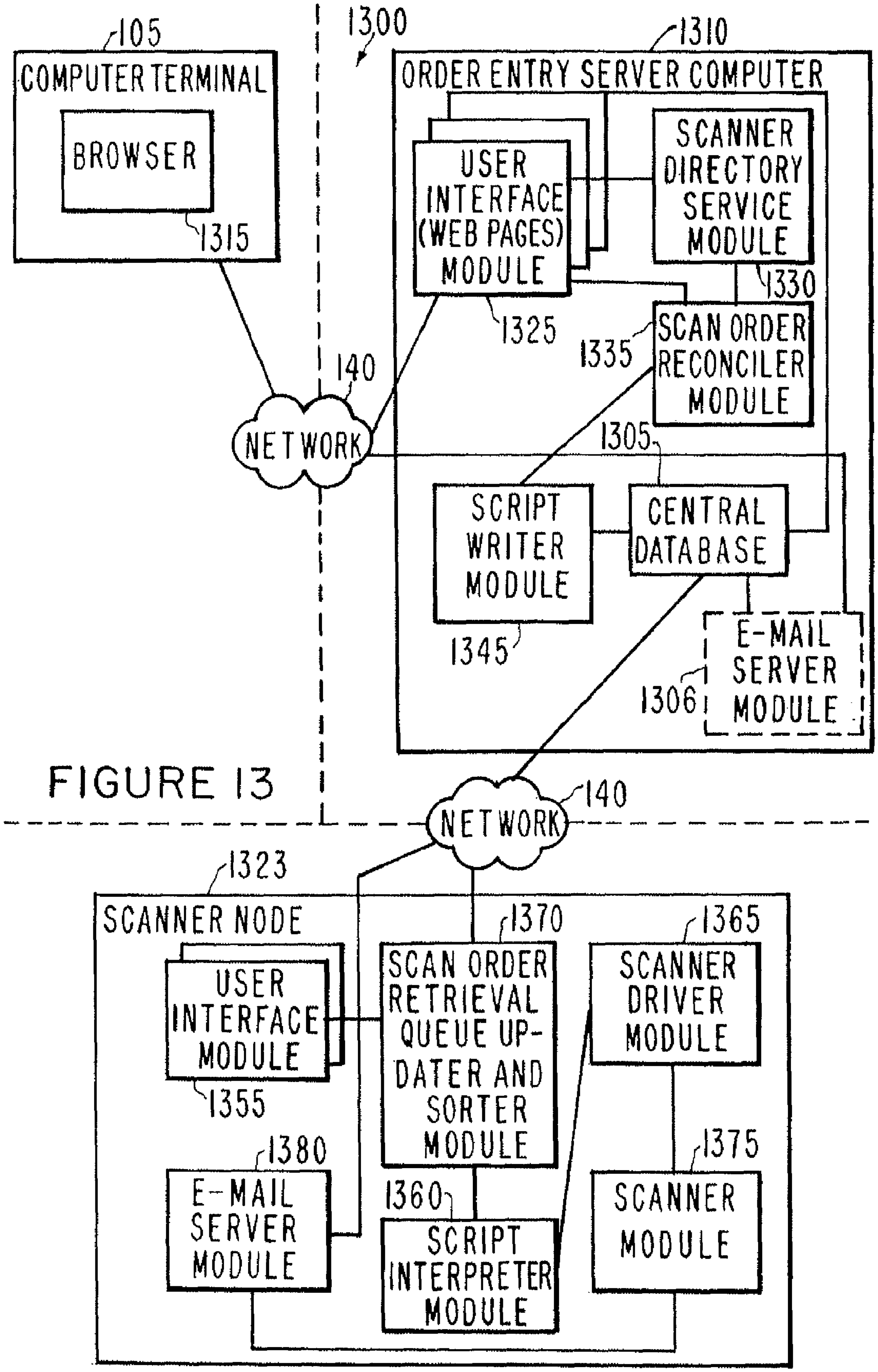
FIG. 13 is a block diagram of a second embodiment of the computer network scanning system 100 of the present invention, in which the scan orders 1100 are stored in and retrieved from a central database 1305.

FIG. 13 is a block diagram of an alternative embodiment 1300 of the computer network scanning system of the present invention, in which the scan orders 1100 are stored in and retrieved from a central database 1305. As shown in FIG. 13, a terminal 105 has access to browser software 1315.

An order entry server computer 1310 includes a user interface module 1325, a scanner directory service module 1330, a scan order reconciler module 1335, a central database 1305, and a script writer module 1345. The scanner directory service module 1330 is identical to scanner service directory module 230, scan order reconciler module 1335 identical to scan order reconciler module 235, and script writer module 1345 identical to script writer module 245, hence the similar numbers and names. As with the modules in FIG. 2, each module of the order entry server computer 115 in FIG. 13 is coupled to another as shown in FIG. 13, and the modules may be implemented in hardware, software and/or firmware. The only differences between the order entry server computer 115 illustrated in FIG. 2 versus the order entry server computer 1310 illustrated in FIG. 13 are: (A) the replacement of the email server module 240 with the central database 1305; and (B) an enhanced user interface module 1325. In an alternative embodiment, the central database 1305 may be added to (and need not replace the email server module 1306 in) the order entry server computer 1310. The enhanced user interface module 1325 of FIG. 13 has the same structure and functionality as the user interface module 225 in FIG. 2, except that the enhanced user interface module 1325 also permits the requester to check the status of a scan order 1100 stored in the central database 1305 and to manipulate such scan order 1100.

In the alternative embodiment shown in FIG. 13, instead of emailing via the email server module 240 the scan order 1100 over the computer network 140 to the scanner node 1323 designated in the scan order 1100, the entry order server 1310 sends the reconciled scan order 1100 to a central database 1305. The central database 1305, which may reside in the order entry server computer 1310 as illustrated in FIG. 13, or outside, contains a record of all scan orders 1100 submitted to the computer network scanning system 1300. Each scanner node 1323 on the computer network 140 has access to the contents of the central database 1305. When a scanner node 1323 has completed processing a scan order 1100 assigned to it, the scan order 1100 is deleted from the central database 1305. The central database 1305 may be used to track the status of all outstanding scan orders 1100 processed by the computer network scanning system 1300.

As further illustrated in FIG. 13, the alternative embodiment 1300 of the computer network scanning system 1300 also includes at least one scanner node 1323. The scanner node 1323 comprises a script interpreter module 1360, a scanner driver module 1365, a scanner module 1375, an email server module 1380, a scan order retrieval, queue updater and sorter module 1370, and a user interface module 1355. Each module of the scanner node 1323 is coupled to another as shown in FIG. 13, and each module may be implemented in hardware, software and/or firmware. The script interpreter module 1360 is identical to the script interpreter module 260, scanner driver module 1365 identical to scanner driver module 265, scanner module 1375 identical to scanner module 275, email server module 1380 identical to email server module 280, and user interface module 1355 identical to user interface module 255, hence the similar names and numbers. The scan order retrieval, queue updater and sorter module 1370 is also identical to the scan order queue updater and sorter module 270, except that the scan order retrieval, queue updater and sorter module 1370 also retrieves scan orders 1100 from the central database 1305 each time the resources of the scanner node 1323 become available.

Otherwise, the scanner node 1323, like the scanner node 125, (a) invokes the scanning mode, (b) parses the scan order 1100 using the script interpreter module 1360, (c) updates the queue of scan orders 1100 at the scanner node 1323, (d) prioritizes the scan orders 1100 in the updated queue according to a predetermined algorithm, (e) lists the prioritized scan orders 1100, (f) selects one of the scan orders 1100 in the queue, (g) obtains the item to be scanned, (h) sets the scanner node 1323 to the desired settings and parameters as specified in the scan order 1100, (i) has items to be scanned placed into the scanner module, (j) has scanning initiated, (k) sends a scanned image to the address(es) and according to the instructions specified in the scan order 1100 using the email server module 1380, and (l) sends notification using the email server module 1380 of completion of the scan order to any parties indicated in the scan order 1100.

Figure 14:
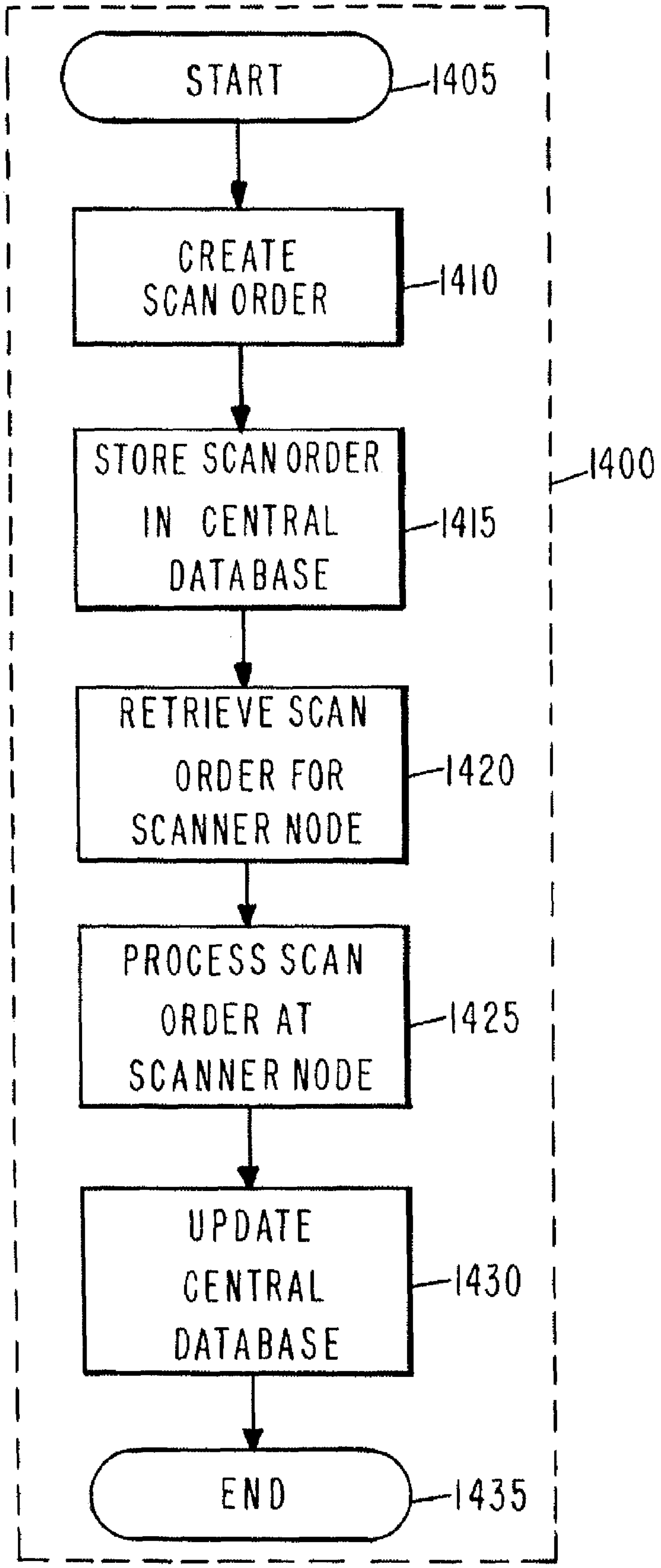
FIG. 14 is a flow diagram illustrating an alternative embodiment of the computer network scanning method 1400 of the present invention, in which scan orders 1100 are stored in and retrieved from a central database 1305.

FIG. 14 is a flow diagram of an alternative embodiment 1400 of the computer network scanning method of the present invention, in which the scan orders 1100 are stored in and retrieved from a central database 1305. At the start 1405 of the operation, the requestor situated at a terminal 105 interacts with an order entry server computer 1310 to create 1410 a scan order 1100. After creating 1410 the scan order 1100, the order entry server computer 1310 stores 1415 the scan order 1100 in the central database 1305. When a scanner node 1323 becomes available, the scanner node 1323 retrieves 1420 from the central database 1305 the scan orders for that scanner node 1323 and processes 1425 a selected scan order 1100. The substeps for creating 1410 a scan order in FIG. 14 are identical to the substeps of creating a scan order 310 in FIG. 4, and the substeps of processing 1425 the scan orders are identical to the substeps for processing the scan order shown in FIG. 6. After processing the scan order 1100 at the scanner node 1323, in the alternative embodiment 1400 of the computer network scanning method, the scanner node 1323 updates 1430 the central database 1305, after which the process ends at 1435.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A scanning system, comprising:

a computer terminal configured to accept input of a scan setting for causing a scanner node to scan an image, and a destination to which the scanned image is to be sent;

a server configured to store a scan order including the scan setting and the destination, and to provide the scan order to the scanner node; and the scanner node, the scanner node being configured to retrieve the scan order including the scan setting and the destination remotely from the server over a network and to process the retrieved scan order, wherein by processing the retrieved scan order, the image is scanned at the scanner node according to the scan setting included in the retrieved scan order, and the scanned image is sent to the destination included in the retrieved scan order.

2. The scanning system of claim 1, wherein the computer terminal invokes a scan order entry form from the server, and accepts the input according to the invoked scan order entry form.

3. The scanning system of claim 2, wherein the computer terminal has a browser software for displaying the invoked scan order entry form.

4. The scanning system of claim 1, wherein the server reconciles the input scan setting with a capability profile of the scanner node to perform scanning, and creates the scan order in accordance with the reconciliation result.

5. The scanning system of claim 1, wherein the scanner node sends a notification of a completion of the scan order.

6. The scanning system of claim 5, wherein the scanner node deletes the obtained scan order in a case where the obtained scan order expires.

7. The scanning system of claim 1, wherein the computer terminal accepts input of information indicating when the scan order expires.

8. The scanning system of claim 7, wherein the information indicating when the scan order expires is a time when the scan order expires or a number of times the scan order can be processed.

9. The scanning system of claim 1, wherein, when the scanner node has completed processing the scan order, the scan order is deleted from the server.

10. The scanning system of claim 1, wherein the destination is a remote destination different from all of the scanner node, the server and the computer terminal.

11. A scanning method comprising:

accepting input of a scan setting and a destination at a computer terminal, wherein the scan setting is a setting for causing a scanner node to scan in image and the destination is a destination to which the scanned image is to be sent;

storing a scan order at a server, wherein the scan order includes the scan setting and the destination, and providing the scan order to the scanner node;

retrieving the scan order including the scan setting and the destination at the scanner node remotely from the server over a network; and processing the retrieved scan order by the scanner node;

wherein by processing the retrieved scan order, the image is scanned at the scanner node according to the scan setting included in the retrieved scan order, and the scanned image is sent to the destination included in the retrieved scan order.

12. A computer-readable memory medium having computer-executable process steps stored thereon, wherein said process steps cause a computer terminal and a server and a scanner node to perform a scanning method wherein said process steps comprise:

an accepting step to accept input of a scan setting and a destination at the computer terminal, wherein the scan setting is a setting for causing a scanner node to scan in image and the destination is a destination to which the scanned image is to be sent;

a storing step to store a scan order at the server, wherein the scan order includes the scan setting and the destination;

a providing step to provide, by the server, the scan order to the scanner node;

a retrieving step to retrieve the scan order including the scan setting and the destination at the scanner node remotely from the server over a network; and a processing step to process the retrieved scan order by the scanner node;

wherein by processing the retrieved scan order, the image is scanned at the scanner node according to the scan setting included in the retrieved scan order, and the scanned image is sent to the destination included in the retrieved scan order.

13. A scanning system, comprising:

a computer terminal configured to accept input of a scan setting for causing a scanner node to scan an image, and a destination to which the scanned image is to be sent;

a database configured to store a scan order including the scan setting and the destination, the scan order being provided to the scanner node; and the scanner node, the scanner node being configured to retrieve the scan order including the scan setting and the destination remotely from the database over a network and to process the retrieved scan order, wherein by processing the retrieved scan order, the image is scanned at the scanner node according to the scan setting included in the retrieved scan order, and the scanned image is sent to the destination included in the retrieved scan order.

14. A scanning apparatus comprising:

a retrieving unit configured to retrieve a scan order remotely over a network from a server which stores the scan order, the retrieved scan order including a scan setting for causing the scanning apparatus to scan an image and a destination to which the scanned image is to be sent;

a scanning unit configured to scan the image according to the scan setting included in the retrieved scan order; and a controlling unit configured to cause the scanned image to be sent to the destination included in the retrieved scan order.

15. The scanning apparatus according to claim 14, wherein a computer terminal accepts input of the scan setting and the destination, and the server stores the scan order including the input scan setting and the input destination.

16. The scanning apparatus according to claim 14, further comprising:

a notification unit configured to send a notification of a completion of the scan order.

17. The scanning apparatus according to claim 14, further comprising:

a deleting unit configured to delete the scan order in a case where the scan order expires.

18. The scanning apparatus according to claim 14, wherein the scan order expires when a time expires or a number of times the scan order can be processed expires.

19. The scanning apparatus according to claim 14, wherein, when the scanning apparatus has completed processing the scan order, the scan order is deleted from the server.

20. The scanning apparatus according to claim 19, wherein a computer terminal accepts input of the scan setting and the destination, and the database stores the scan order including the input scan setting and the input destination.

21. The scanning apparatus according to claim 14, wherein the destination is a remote destination different from all of the scanner node, the server and the computer terminal.

22. A scanning apparatus comprising:

a retrieving unit configured to retrieve a scan order remotely over a network from a database which stores the scan order, the retrieved scan order including a scan setting for causing the scanning apparatus to scan an image and a destination to which the scanned image is to be sent;

a scanning unit configured to scan the image according to the scan setting included in the retrieved scan order; and a controlling unit configured to cause the scanned image to be sent to the destination included in the retrieved scan order.

* * * * *